(12) United States Patent
Wang et al.

(10) Patent No.: US 8,248,932 B2
(45) Date of Patent: Aug. 21, 2012

(54) METHOD AND APPARATUS FOR FAIRLY SHARING EXCESS BANDWIDTH AND PACKET DROPPING AMONGST SUBSCRIBERS OF A DATA NETWORK

(75) Inventors: Xiaolin Wang, Concord, MA (US);
Sijian Lin, Boylston, MA (US);
Zachary Filan, Holden, MA (US);
Craig B. Agricola, Holden, MA (US)

(73) Assignee: West Lane Data LLC, Las Vegas, NV (US)

( * ) Notice: Subject to any disclaimer, the term of this patent is extended or adjusted under 35 U.S.C. 154(b) by 1155 days.

(21) Appl. No.: 10/854,687

(22) Filed: May 26, 2004

(65) Prior Publication Data
US 2005/0276219 A1 Dec. 15, 2005

(51) Int. Cl.
*G01R 31/08* (2006.01)
*H04L 12/28* (2006.01)

(52) U.S. Cl. ......... 370/231; 370/235; 370/253; 370/419

(58) Field of Classification Search .......... 370/230–235, 370/252–254, 395.2, 395.21, 395.4, 395.41, 370/412–414, 419–420, 428–429, 401–402
See application file for complete search history.

(56) References Cited

U.S. PATENT DOCUMENTS

| | | | |
|---|---|---|---|
| 4,644,529 A | | 2/1987 | Amstutz et al. |
| 4,748,618 A | | 5/1988 | Brown et al. |
| 5,784,358 A | * | 7/1998 | Smith et al. ............ 370/230 |
| 5,995,487 A | * | 11/1999 | Weaver et al. ......... 370/395.21 |
| 6,405,257 B1 | * | 6/2002 | Gersht et al. ............ 709/235 |
| 6,570,883 B1 | | 5/2003 | Wong |
| 6,621,828 B1 | | 9/2003 | Field et al. |
| 6,622,232 B2 | | 9/2003 | Schroeder |
| 6,822,960 B1 | | 11/2004 | Manchester et al. |
| 6,907,003 B1 | * | 6/2005 | Gvozdanovic ........... 370/232 |
| 6,914,882 B2 | | 7/2005 | Merani et al. |
| 6,914,883 B2 | * | 7/2005 | Dharanikota ........... 370/230.1 |
| 6,999,420 B1 | * | 2/2006 | Chiu et al. .............. 370/231 |
| 7,145,871 B2 | * | 12/2006 | Levy et al. .............. 370/229 |
| 7,251,218 B2 | | 7/2007 | Jorgensen |
| 7,266,122 B1 | * | 9/2007 | Hogg et al. ........... 370/395.41 |
| 7,307,949 B1 | * | 12/2007 | Washburn et al. ........ 370/230 |
| 2002/0038366 A1 | * | 3/2002 | Harasawa ............... 709/224 |
| 2002/0095498 A1 | * | 7/2002 | Chanda et al. .......... 709/225 |

(Continued)

FOREIGN PATENT DOCUMENTS

EP 1 345 366 9/2003

(Continued)

OTHER PUBLICATIONS

Iyer et al., Routers with a Single Stage of Buffering, Proc. of ACM SIGCOMM, Aug. 2002, pp. 251-264.

(Continued)

*Primary Examiner* — Andrew Chriss
*Assistant Examiner* — Redentor Pasia (57) ABSTRACT

In the routing of data traffic to a common destination egress queue from a plurality of customer subscribers each contracting for respective allocations of bandwidth of data flow, a technique and system for fairly sharing any underutilized excess bandwidth and for data dropping amongst over-subscribers, while guaranteeing each subscriber its contracted-for bandwidth, and further enabling billing over-subscribers for their share of received excess bandwidth—all while maintaining the granularity of the contracted traffic flow.

45 Claims, 3 Drawing Sheets

U.S. PATENT DOCUMENTS

| | | | |
|---|---|---|---|
| 2002/0107908 A1* | 8/2002 | Dharanikota | 709/203 |
| 2002/0141425 A1 | 10/2002 | Merani et al. | |
| 2003/0033467 A1 | 2/2003 | Yoshizawa et al. | |
| 2003/0174650 A1 | 9/2003 | Shankar et al. | |
| 2003/0189934 A1* | 10/2003 | Jeffries et al. | 370/395.4 |
| 2004/0136370 A1 | 7/2004 | Moore et al. | |
| 2004/0177087 A1 | 9/2004 | Wu et al. | |
| 2006/0159019 A1* | 7/2006 | Buskirk et al. | 370/235 |
| 2007/0268826 A1 | 11/2007 | Balakrishnan et al. | |

FOREIGN PATENT DOCUMENTS

| | | |
|---|---|---|
| EP | 1 225 734 | 3/2006 |
| EP | 0 859 492 | 9/2006 |

OTHER PUBLICATIONS

Karol et al., "Input Versus Output Queueing on a Space-Division Packet Switch," IEEE Transactions on Communications, vol. COM-35, No. 12, Dec. 1987, pp. 1347-1356.

Nick McKeown, "Fast Switched Backplane for a Gigabit Switched Router," Business Communication Review, Dec. 1977, 30 pages.

Nick McKeown, "The iSLIP Scheduling Algorithm for Input-Queued Switches," IEEE/ACM Transactions on Networking, vol. 7, No. 2, Apr. 1999, pp. 188-201.

Non-Final Office Action on U.S. Appl. No. 09/941,144, mailed Jun. 14, 2005.

Non-Final Office Action on U.S. Appl. No. 10/702,152, mailed Aug. 3, 2007.

Notice of Allowance on U.S. Appl. No. 09/941,144, mailed Sep. 13, 2005.

Notice of Allowance on U.S. Appl. No. 10/702,152, mailed May 14, 2009.

Notice of Allowance on U.S. Appl. No. 10/702,152, mailed Jul. 14, 2008.

Tamir et al., "Symmetric Crossbar Arbiters for VLSI Communication Switches," IEEE Transactions on Parallel and Distributed Systems, vol. 4, No. 1, pp. 13-27 (1993).

* cited by examiner

METHOD AND APPARATUS FOR FAIRLY SHARING EXCESS BANDWIDTH AND PACKET DROPPING AMONGST SUBSCRIBERS OF A DATA NETWORK

FIELD OF INVENTION

This invention deals with data packet routing and the like to a common destination egress queue and with transmission along a common communication fiber optic link(s) from pluralities of subscribers for data traffic transmission, each contracting for respective allocated and subscribed bandwidths of data traffic flow; the invention being more particularly concerned with the utilization and sharing of available excess bandwidth and packet dropping amongst the subscribers in a fair manner, accommodating the granularity of the contracted traffic flow.

BACKGROUND OF INVENTION

In order to prevent interference amongst various subscriber-contracted data packet traffic flows in a router targeting transmission to the same destination egress, and ultimately along a common transmission fiber optic link(s) or the like, a mechanism is needed to enable such a router to maintain fairness among all the contracted flows to the same egress queue, in terms of excess bandwidth sharing and in accommodatable data packet dropping or discarding. The router, moreover, is required to be capable of providing guaranteed contracted-for service in terms of bandwidth, latency, jitter and drop rate characteristics within Service Level Agreement (SLA).

Prior art routing has heretofore been subject to the limitations of inefficient usage of egress bandwidth and of unfair dropping of competing ingress port data traffic under conditions of congestion.

Specifically, in prevailing architectures, when a plurality of ingress ports sends variable-sized data packets to a given egress queue, they do so without knowledge of the egress queue data. The contribution of an individual port to a given egress queue is accordingly limited totally by the nature of the incoming data on that port. This gives rise to two problems, as follows.

First, since traffic patterns in networks are bursty and dynamically changing over a given time duration, a particular port (say Port A) may not actually send the pre-subscribed or contracted-for average data rate to a particular egress. Thus it does not fully utilize its contracted bandwidth over time. In such instances, another port (say Port B) may have a need to send more than its average contracted data rate. So, in reality, Port B should be able to utilize "unused" bandwidth from Port A to send the data. Since, however, there is no knowledge of unused available bandwidth at Port B, Port B usually ends up dropping the traffic that dynamically exceeds its average data rate, resulting in inefficient usage of egress bandwidth.

Secondly, in cases where a plurality of ingress ports have a need to send data to a given egress port, there are times where the egress port is oversubscribed and congested. Some of the intended traffic targeted to this egress port must accordingly be dropped. This drop, however, needs to be fair among all the competing ingress ports. If one of the ingress ports is contributing much more to congestion, then it should experience more drops than other ingress ports that are not contributing so much to congestion. Prevailing architectures, unfortunately, do not allow the drop decision to be functioning with regard to both the egress queue depth and the ingress traffic behavior. This inability, therefore, results in unfair drops using present-day conventional techniques. In particular, prior RED (Random Early Detect/Discard) mechanisms apply a drop probability function based on queue depths of a virtual output queue maintained on the ingress side, as described, for example, in an article entitled "Random Early Detection gateways for Congestion Avoidance" by S. Floyd and V. Jacobson appearing in IEEE/ACM Transactions on Networking, August 1993. They do not take into account the actual queue depth of the actual egress queue.

As will later be explained, the present invention, on the other hand, allows for the proper usage of the actual egress queue depth-based drops, meeting the true intent of RED mechanisms that is not achieved by queue depth-based drops based on a virtual egress or conventional output queue postulation on the ingress side as is done in currently input buffered switch/router systems.

Present-day Random Early Detection is thus an output queue based mechanism, wherein the data drop (or mark) probability is proportional to the aggregation of the input data rate only. It is unable to identify where a packet comes from at an output or egress queue when the drop (mark) decision is made. When congestion has been detected at an output queue, therefore, the RED function randomly drops the data packet irrespective of how much bandwidth a customer may have contract-subscribed. The higher data rate one sends, indeed, the more packets that are dropped. The prior RED systems may, indeed, drop packets from a subscriber who is not exceeding its contract. Based on TCP protocol, that customer may thus unfairly be forced to reduce its output rate even though that customer has actually paid for that rate.

Using the traditional RED mechanisms, accordingly, a service provider is not able to guarantee allocated bandwidth to a customer for TCP traffic. The packets from that customer may indeed be dropped because of misbehavior of other customers. This forces a customer to reduce its data transferring rate even if the customer never over-subscribed. A service provider has no way, thus, to guarantee the promised bandwidth with current RED mechanisms. Since the traditional RED mechanism drops packets based on data accumulation of the output queue only, unfairness results among input flows similar to the above-described example.

In accordance with the present invention, on the other hand, fairness is introduced wherein a packet cannot be dropped just based on the rate of traffic alone. The invention rather enforces the rule that no packet should be dropped by the data flow switch for "in-contract traffic" under the guaranteed bandwidth provided for that flow.

Over-subscribed flows, however, may violate their respective contracts in different degrees. One that over-subscribes bandwidth, however, should be penalized. In practice, some flows under-subscribe the bandwidth of their contracts, while others over-subscribe their allocated bandwidth. The extra bandwidth available from under-subscribed flows may be less than the bandwidth over-subscribed by others, so this excess bandwidth should be fairly distributed to those over-subscribed flows. In accordance with the invention, therefore, the percentage of excess bandwidth a flow may receive is proportional to the amount of bandwidth in its contract. In other words, the out-of-contract traffic should be dropped proportionally to its rate of over-subscribing. This may be expressed mathematically as follows:

$$R_{drop} = \frac{R - R_{contract}}{R} \qquad (1)$$

$$D = T \times R_{drop}, \qquad (2)$$

where R is the rate of traffic flow, $R_{contract}$ is the bandwidth the customer bought in its contract, $R_{drop}$ is the drop rate of the flow, T is the traffic flow, and D is the amount of data dropped. Since the nature of IP traffic is bursty, the fairness of sharing available excess bandwidth and of the data packet drops from all traffic flows is even more important and is addressed by the present invention.

Mechanisms for implementing such fairness include also input data packet forward processing systems for policing the provision of fair service for all input flows. This cuts the over-subscribed traffic irrespective of the bandwidth actually existing at the egress side. Bandwidth that is not used by other customer-flows at that moment, however, is lost. In addition, most Internet based TCP/IP traffic is, by nature, very bursty with the bursts of different traffic flow usually not happening at the same phase. The matter of how to share the bandwidth, however, is one of most critical aspects of the Internet switch. Input policing is not an ideal mechanism for managing such bursty traffic—it wastes bandwidth and resources and money.

Further under the present invention, accordingly, the input or ingress packet forward processing system is caused to allow over-subscribed traffic to be transferred if there is excess bandwidth available. The processing also provides a weight account for the extra bandwidth that a customer consumes, and a mechanism to enable the service provider appropriately to charge for it.

Under the invention, the packet-dropping decision is consolidated into one traffic management (TM) process in view of the fact that an end node actually has no idea as to the reason that its packet was dropped. A packet dropped for some management reason is, indeed, not distinguished from one dropped by the RED mechanism. An end node may reduce the amount of data supposedly to avoid congestion, whereas, in actual fact, no congestion may even exist. The real drop probability is then higher than necessary. Based upon the above, the present invention, as previously stated, consolidates the drop functions into one entity.

As earlier noted, in order to maximize the throughput, passing or dropping decisions must also be based on the actual output queue situation. Hence the output buffer switch is also necessary efficiently to share the resources in handling bursty traffic such as TCP/IP traffic, and, indeed, creates a new business revenue path for service providers.

By nature, this preferred electronic switch fabric (ESF) is indeed an output buffer switch, and such precisely provides the output queue status to allow making control decisions wisely.

The invention, indeed, preferably uses in its best mode, the type of output-buffered shared memory system described for the data-switch fabric system (ESF) switch router in U.S. patent application publication No. 2003/0043 828 A1, Mar. 6, 2003, Method Of Scalable Non-Blocking Shared Memory Output-Buffered Switching Of Variable Length Data and Packets From Pluralities Of Ports At Full Line Rate, And Apparatus Therefor (U.S. patent application Ser. No. 09/941, 144, filed Aug. 28, 2001). This system, moreover, is preferably addressed by the technique of U.S. patent application publication No. 2003/0120594A1, Jun. 26, 2003, Method Of Addressing Sequential Data Packets From A Plurality Of Input Data Line Cards For Shared Memory Storage And The Like, And Novel Address Generator Therefor (U.S. patent application Ser. No. 10/026,166, filed Dec. 21, 2001, now U.S. Pat. No. 6,684,317. Other systems may also be suitable for some applications, but the use of these preferred shared-memory techniques, however, provides the advantage of scalable-port non-blocking shared-memory output-buffered variable length queued data switching and with sequential data packet addressing particularly adapted for such shared memory output-buffered switch fabrics and related memories.

Such output buffered switching alone, however, may not always be better than the earlier described input buffer switching for the purposes herein. An input buffer switch, indeed, has the advantage over an output buffer switch that it is capable of identifying different traffic flows, and therefore makes a measure of flow-based fairness dropping possible. It also allows the switch to drop data packets from only "out-of-contract traffic flow", and provides a bandwidth-based billing mechanism for bursty traffic flow, as previously mentioned. In addition, it completely avoids global synchronization from traditional RED mechanisms.

The present invention, accordingly, in its previously described novel approach of consolidating the drop functions into a single entity, provides both input packet forward processing system capability and an output buffer switch capability and in combination to support a much more sophisticated and improved type of flow-based fairness dropping. The invention, moreover, unlike current input buffer switching systems where buffering is required in view of limitations in switching in the switch fabric, does not use buffer switching in the input or ingress.

In summary, therefore, the passing or dropping decision under the invention, is made based upon both destination queue status and input flow status, with the ESF providing the information on both statuses.

The invention, furthermore, again unlike the prior art, bases the drop probability function on two parameters: (1) the over-subscribing rate of current data flow, and (2) the actual egress queue depth. Depending upon the egress port situation, over-subscribed packets may or may not go through the switch. The drop rate mode is proportional to the ratio of data flow over-subscribing, with data flow being characterized by bandwidth and burst size.

To make implementation possible in practice, in accordance with a further novel feature of the invention, the over-subscribing rate is digitized with three conditions or "colors"; (1) in-contract; (2) out-of-contract but in burst size; and (3) out of both contract and burst size. There is one drop probability function per "color", and the three of them together implement a three-dimensional function that provides the new results attained herein.

Under the invention, thus, data packets from an under-subscribed or under-used allocated flow are guaranteed not to be dropped when the destination egress queue is not over-booked. Packets from over-subscribed flows, moreover, are dropped only when either no excess bandwidth is allowed for that flow, or no excess bandwidth is available at the destination egress port. Excess bandwidth from under-subscribed or under-used flows are desirably distributed amongst the over-subscribed flows proportionally to the contracted bandwidth of each flow, or distributed based upon other factors, such as being controlled by the setting of a pre-specified set of drop functions or the like. Thus, by default, the drop rate of each flow is proportional to the percentage of over-subscribed bandwidths, or is controlled by setting the drop function in a way so as to be intentionally biased toward certain flows.

The methodology of the invention for attaining an improved fair distribution to the over-subscribed flows, moreover, is easily configured, where desired, to simulate traditional RED mechanisms, though with the distinct improvements earlier discussed.

The technique of the invention is of quite broad application, furthermore, being particularly useful in the transmission of variable length data packets and with configurable adaptive output scheduling for enabling simultaneous transmission on a common transmission link, as of fiber optics, of differentiated services for various different traffic types. These may range from high priority real-time voice, to financial transactions or the like, and in a converged network environment as described in co-pending U.S. patent application Ser. No. 10/702,152, "Method Of And Apparatus For Variable Length Data Packet Transmission With Configurable Adaptive Output Scheduling Enabling Transmission On The Same Transmission Link(s) Of Differentiated Services For Various Traffic Types, filed Nov. 5, 2003. Such a system, indeed, provides for the execution of the various different QOS (quality of service) algorithms used with such various different traffic types while co-existing in a converged network environment and also while simultaneously preserving the respective different service characteristics for real-time or high-priority traffic and providing for supplemental bandwidth allocation, all the while addressing maximal link utilization. This result is attained, moreover, through fine and balanced control of which type of traffic is transmitted on the link for a given duration, and how much of that traffic is transmitted on the link.

The present invention brings to such converged network environments, moreover, a further universal refinement of the before-mentioned guaranteeing of contracted-for-bandwidth to respective customers, and of the novel RED mechanism for providing vastly improved fairness in the sharing of unused bandwidth with the over-subscribing customer data flows and in the data dropping—all consolidated into a single entity, as earlier mentioned, that also enables the new business opportunity for billing for over-subscribed usages of excess available bandwidth.

OBJECTS OF INVENTION

A principal object of the invention, therefore, is to provide a new and improved method of and apparatus for data packet routing to a common egress from a plurality of subscribers, each contracting for respective bandwidths of data flow, and that shall not be subject to the above-described and other limitations in prior art approaches, but that, to the contrary, shall provide for fairly sharing excess bandwidth and packet dropping amongst the subscribers and with the granularity of contracted traffic flow and the guaranteeing of the contracted bandwidth of the respective subscribers.

A further object is to provide a novel excess bandwidth sharing methodology of more general utility as well, including a technique for billing for the use of over-subscribed customer bandwidth made available from other customer under-usage of its contracted-for bandwidth.

Still a further object is to provide the above novel results with a single network for all types of services and service priorities and with improved network utilization and billing capability.

Other and further objects will be hereinafter pointed out and are more fully delineated in the appended claims.

SUMMARY

In summary, however, the invention, in one of its broader aspects, embraces a method of guaranteeing the respective bandwidths contractually allocated to a plurality of data communication subscribing customers for sending their respective data packets through respective ingresses of a switch/router to one or more common egresses for transmission along communication links of predetermined data flow capacity, while protecting against one or more of such customers using more than its allocated bandwidth to the detriment of the guaranteed contract-subscribed bandwidths of other customers, the method comprising, monitoring the data flow for each customer at its respective ingress to determine conformance with the allocated subscribed bandwidths; in the event of an attempt by one customer to exceed its allocated bandwidth, determining at said ingresses if other customers may be underutilizing their allocated bandwidths, thus providing free or excess capacity; in the event that there is no such underutilization, thereupon, in fairness to the other customers, guaranteeing each customer its allocated bandwidth if desired, and restricting said one customer from exceeding its allocated bandwidth by dropping the excess; but in the event that underutilization of bandwidth indicating excess capacity is monitored, permitting such exceeding of its allocated bandwidth by said one customer but only to the extent of such excess capacity.

In the event that there is a plurality of over-subscribing customer flows, the invention provides for the fair allocation sharing of unused bandwidth of other customers and for enabling billing for such over-subscribed usage. This is effected by using both the monitoring of the input or ingress packet forward processing of the respective customer ingress data flows, and also output buffered switching to provide information on the actual (not a virtual) output or egress queue situation; such that switch data-passing or data-dropping decisions are based precisely on the actual output queue status. This enables control decisions to be made and with efficient sharing of the bandwidth resources to handle bursty traffic, such as TCP/IP traffic, and also, as before stated, creates a new revenue path or source for billing by service providers.

To aid in the above, the data dropping probability function used by the present invention in its preferred form, has two parameters—the over-subscribing rate of current data flow, and the actual (real-time) egress or output queue depth. Depending upon the egress port situation or status, over-subscribed data packets may or may not go through the switch. The drop rate is adjusted to be proportional to the rate that a flow is over-subscribed. The flow is characterized by bandwidth and burst size. In implementation, the over-subscribing rate is digitized, as earlier discussed, with three situation components or "colors"—(1) within contract; (2) out-of-contract but within burst size; and (3) out-of-contract and burst size—with one drop function per color, such that the three together implement a three-dimensional drop function.

Preferred and best mode designs and implementations are hereinafter detailed.

DRAWINGS

The invention will now be described in connection with the following illustrative drawings, FIG. 1 of which (A, B and C) illustrates data throughput time windows of exemplary traffic flow.

PREFERRED EMBODIMENT(S) OF THE INVENTION

The invention will first be generally explained in connection with the overall switch-routing diagrammatic system of FIG. 2, wherein the electronic switch fabric ESF is shown with exemplary input or ingress data packet flows applied to a plurality of flow monitors $C_0$ through $C_{63}$ at the ingress I from a source of a corresponding plurality of line cards $LC_0$-$LC_{63}$ to respective packet drop or acceptance decision gates Gate 0 through Gate 63 for transmission through a switch/router SR to a common egress queue at E for transmitting customer data packets to a transmission link such as a fiber-optic transmission path L to a destination, with the before-described adaptive output scheduling at S.

The particular hardware or software or combination implementation by specific structures or functions or types of switching fabric ESF, router SR, input packet forward processors and decision gates and output buffer switches at E or type of transmission link L, may be of many well-known types, including those specifically described in the before-referenced publications and applications—but these are not per se the novelty of the present invention which lies, rather, in the methodology and system operation of such structures in the novel arrangement and manner earlier discussed to attain the new results of the invention.

Description herein therefore centers on such novel operational methodology of the invention and not on the details of the myriad of alternative known useable specific switching fabrics and the like. Such are accordingly illustrated in generalized form so as not to detract from the features of the novelty of the present invention. In preferred or best mode form, however, such structures are preferably those of the previously cited and described patent applications, as earlier and later mentioned.

As also before described, the invention takes advantage of both the use of input or ingress data packet forward processing for its capability of identifying the input flow status of the different input data packet flows from the plurality of respective bandwidth-contracting customers (block I in FIG. 4) and the use of output or egress buffer switching E to provide actual destination queue status. This is communicated by path F, FIG. 2, to the ingress data packet forward processing system that enables making fairness in data packet dropping decisions possible and from only "out-of-contract" traffic flow (and, as before-described); providing a bandwidth-based billing mechanism, even for bursty traffic flow as before described); and the output buffer switch supports the admitting or passing, or the dropping decision, (FIG. 4, block IV), as also previously described, done in cooperation with the input buffer packet monitoring and forward processing. The passing or dropping decision is thus made, in accordance with the invention, based both upon destination queue status and input flow status, the system providing the information for both statuses.

Figure 1A:
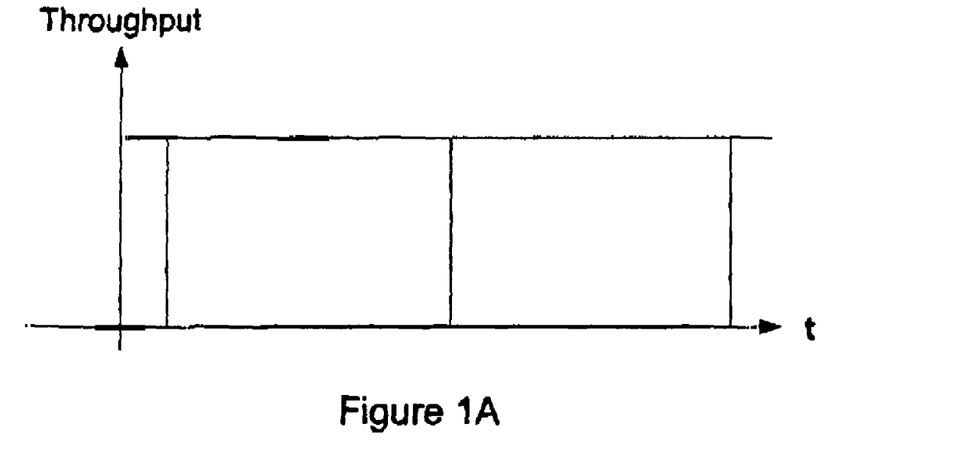
Figure 1B:
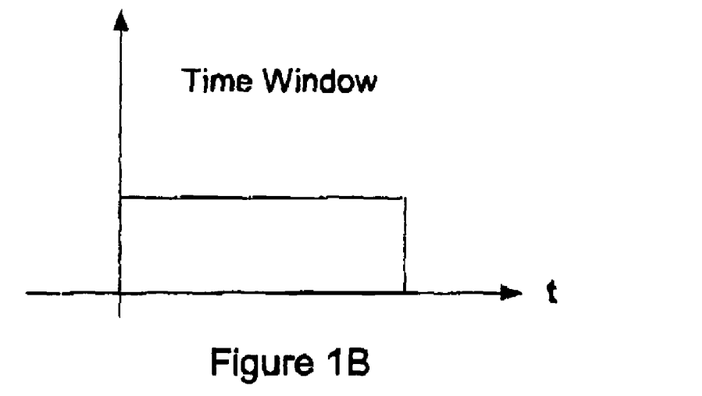
Figure 1C:
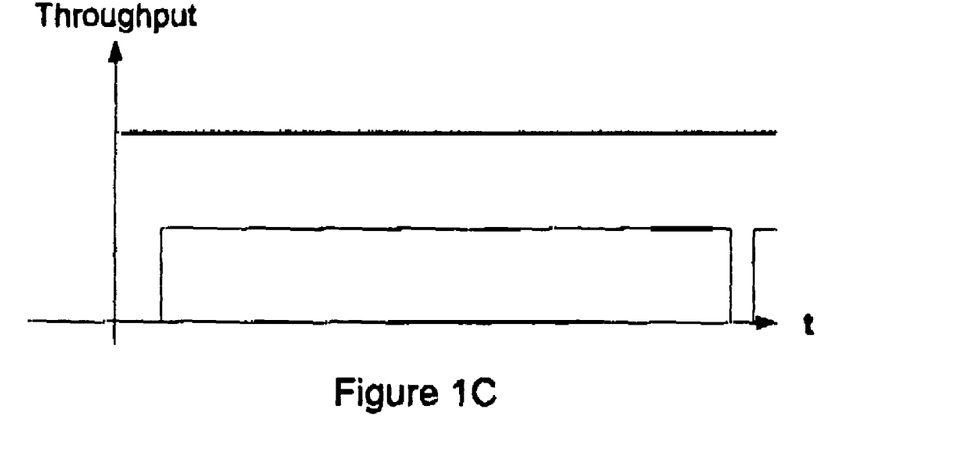

In general, a bandwidth R that a service provider allocates to a customer may be represented as:

$$R = \frac{dS}{dt}, \tag{3}$$

where S is the total amount of data transferred in bits, and t is the time. In a discrete system, this has to be digitized as follows:

$$R = \frac{\Delta S}{\Delta t}, \tag{4}$$

where the minimum $\Delta t$ is limited by the cycle of a clock-driven chip. In a packet switch, once a data line input card starts transferring a packet, it has to finish it before the next one. The packet size may vary, for example, from 8 bytes to 64,000 bytes. During that time, one traffic flow always takes 100 percent of the bandwidth, and it may take many cycles. The rate of a traffic flow is only meaningful in the context of a time window—in effect, serving as a low pass filter. When slicing along the time access, it smoothes the throughput of a traffic flow as shown in FIGS. 1A, B and C. FIG. 1A represents such traffic flow through a line, either taking 100% of the line rate or nothing. The time window is illustrated at FIG. 1B, and the rate of traffic flow is calculated based on such a time window. The average bandwidth that a traffic flow takes during such a time window is shown in FIG. 1C.

The time window, moreover, is longer than the time needed to transfer the maximum size packet $P_{max}$, using the bandwidth assigned to that customer flow $R_{flow}$. So the minimum time window size is $$W_{flow} = \frac{P_{max}}{R_{flow}}, \tag{5}$$

as otherwise, the maximum size packets will always be dropped. The longer the time window, the larger burst the ESF can absorb. A large time window, however, requires more memory space for the destination queue, and it comes with worse latency and jitter.

Another important parameter is the pace that the time window slices. When the pace gets smaller, irregularity of traffic flow controlling will be more accurate. The pace must be smaller than the time window. Since the traffic flows come from the line cards $LC_0 \ldots LC_{63}$ into the ESF, FIG. 2, and the status of the data flows is also monitored there at $C_0 \ldots C_{63}$, the fastness of the pace can be adjusted by the hardware implementation, which, of course, is heavily related to how many customer data-packet flows a line card LC can monitor.

Returning to FIG. 2, each gate Gate 0 through Gate 63 in this example, makes a data packet admission or drop decision based upon the actual egress queue depth "d"—information fed back to the gates along the dash line F of FIG. 2. The before-mentioned packet data flow monitoring and the "color" assignment or decision for the data packets earlier described and schematically represented at "C", and further explained hereinafter and in FIG. 4, is performed in the respective dataflow monitors $C_0 \ldots C_{63}$. The programming of drop probability curves, illustrated in FIG. 3, is effected in the Gates 0 . . . 63, schematically represented at "P", and, in the light of the egress queue depth information "d", action is taken on the packet data coloring to admit or drop the packet flow to the router switch SR.

Figure 2:
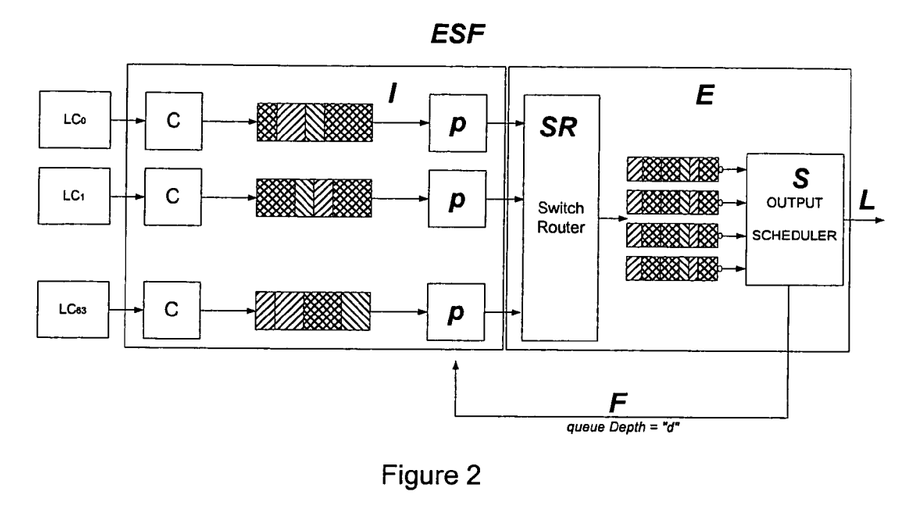
FIG. 2 is a schematic system block diagram for implementing the operation of the invention in preferred form.

Considering further the information C on the "color" of the packet, it was earlier described that, in accordance with the invention in preferred form, the over-subscribing rate is digitized for three conditions or "colors", say "green", "yellow" or "red" indicated in respective shading in FIG. 2 and as represented in the flow chart of FIG. 4—(1) for a customer data packet flow that is within the customer bandwidth allocation of the subscribed contract; (2) for a customer data packet flow that is out-of-contract but within a characterized predetermined flow burst size; and (3) for a customer data packet flow that is both out-of-contract and outside such burst size.

Figure 3:
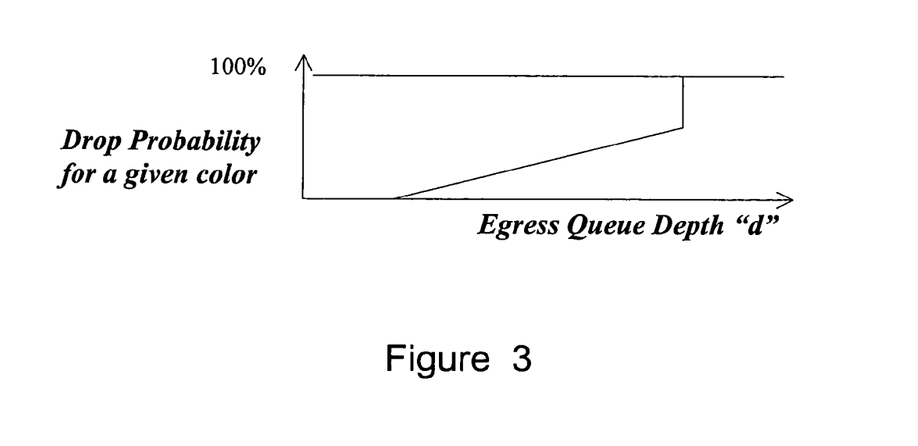
FIG. 3 is a graph illustrating the excess data drop probability from one of the three earlier-mentioned "colors" or situations as a function of the actually monitored output or egress queue depth.
Figure 4:
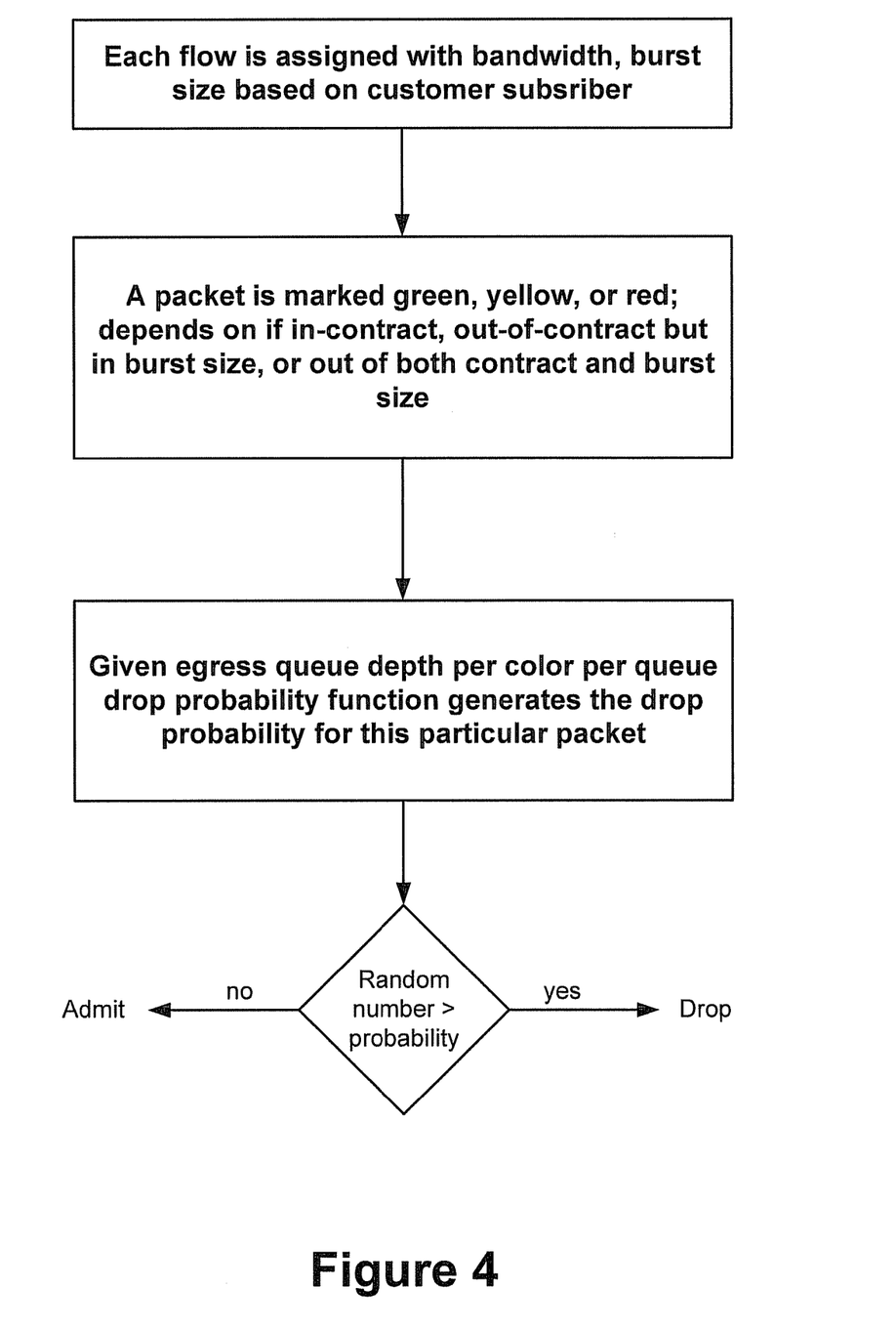
FIG. 4 is a flow chart for the operation of the system of FIG. 2.

In FIG. 3, a typical drop probability curve is plotted illustrative of one of these "color" conditions, as a function of actual monitored egress queue depth "d", and that is made known at the input packet forward processing gates as before discussed (feedback path F, FIG. 2). This exemplary drop probability curve shows rising probability of excess data drop, up to the 100% drop decision at the highest threshold "d". The curves for the three colors together, implement a three-dimensional probability drop function block III, FIG. 4, and ultimately control the admit or drop decision block IV, FIG. 4.

It should be noted, furthermore, that data packets that pass through more nodes between their source and the destination, have higher drop probability. Since the total number of packets which do not make it to the destination may be higher, the overall bandwidth utilization will be lower.

Modifications will also occur to those skilled in this art and such are considered to fall within the spirit and scope of the invention as defined in the appended claims.

What is claimed is:

1. A method comprising:
   monitoring a plurality of data flows at an ingress of an electronic switch fabric (ESF) to determine conformance with a respective subscribed bandwidth allocation associated with each data flow of the plurality of data flows;
   determining at the ingress of the ESF and at an egress of the ESF whether there is excess bandwidth;
   responsive to determining that there is no excess bandwidth, at the ESF:
      determining an actual rate of over-subscribing for the at least one data flow by at least:
         determining a difference between a rate of traffic flow for the at least one data flow and the respective subscribed bandwidth allocation associated with the at least one data flow and
         determining a ratio between the difference and the rate of traffic flow for the at least one data flow, and
      restricting one or more data flows of the plurality of data flows from exceeding the respective subscribed bandwidth allocation associated with at least one data flow of the one or more data flows, wherein restricting the one or more data flows comprises dropping attempted excess data in proportion to the actual rate of over-subscribing of the subscribed bandwidth allocation for the at least one data flow; and
   responsive to determining that there is excess bandwidth at the ESF, permitting each of the one or more data flows to exceed the respective subscribed bandwidth allocation up to an extent of the excess bandwidth.

2. The method of claim 1, further comprising additionally billing for exceeding the respective subscribed bandwidth allocation of the one or more data flows.

3. The method of claim 1, wherein permitting the one or more data flows to exceed the respective subscribed bandwidth allocation comprises allocating a fair share of the excess bandwidth to each of the one or more data flows.

4. The method of claim 3, further comprising:
   billing based on the respective fair share allocated to the one or more data flows.

5. The method of claim 3 wherein allocating the fair share of the excess bandwidth to each of the one or more data flows comprises allocating the fair share of the excess bandwidth in proportion to the respective rate of over-subscribing of the respective subscribed bandwidth allocation.

6. The method of claim 1 further comprising:
   monitoring an egress queue depth to determine destination queue depth status, and wherein restricting the one or more data flows comprises dropping the attempted excess data based on the destination queue depth status.

7. The method of claim 6 wherein permitting the one or more data flows to exceed the respective subscribed bandwidth allocation comprises billing based on the destination queue depth status.

8. The method of claim 6 wherein monitoring the plurality of data flows comprises monitoring the plurality of data flows based on the destination queue depth status.

9. The method of claim 8 wherein a drop probability function is generated in response to the actual rate of over-subscribing of the respective subscribed bandwidth allocation and the destination queue depth status.

10. The method of claim 9 wherein the drop probability function comprises a digitized input for each of at least three conditions, wherein the at least three conditions comprise: data flow within the respective subscribed bandwidth allocation; out-of-contract but within a predetermined burst size; and both out-of-contract and out-of-burst size.

11. The method of claim 10 wherein the drop probability function comprises a combination of the at least three conditions.

12. An apparatus, comprising:
   an output scheduler, configured to determine a depth of an egress queue;
   one or more flow monitors, configured to at least:
      monitor a plurality of data flows at an ingress to determine conformance with a respective subscribed bandwidth allocation associated with each data flow,
      determine a difference between a rate of traffic flow for at least one data flow and the respective subscribed bandwidth allocation associated with the at least one data flow, and
      determine an actual rate of over-subscribing of the subscribed bandwidth allocation for the at least one data flow of the plurality of data flows based on a ratio between the difference and the rate of traffic flow for the at least one data flow; and
   one or more gates, wherein at least one gate of the one or more gates is configured to at least:
      receive the egress queue depth;
      drop excess data for the at least one data flow based on the actual rate of over-subscribing of the subscribed bandwidth allocation for the at least one data flow, responsive to a determination that there is no excess bandwidth based on the egress queue depth; and
      permit each of one or more data flows to exceed the respective subscribed bandwidth allocation for each of the one or more data flows up to the extent of the excess bandwidth, responsive to a determination that there is excess bandwidth based on the egress queue depth.

13. The apparatus of claim 12 further comprising a billing mechanism configured to additionally bill for exceeding the respective subscribed bandwidth allocation of the one or more data flows.

14. The apparatus of claim 12 wherein the at least one gate is further configured to allocate a fair share of the excess bandwidth to each of the one or more data flows.

15. The apparatus of claim 14, further comprising:
   a billing mechanism configured to bill based on the respective fair share allocated to each of the one or more data flows.

16. The apparatus of claim 14 wherein the at least one gate is further configured to allocate the fair share of the excess bandwidth in proportion to the respective rate of over-subscribing of the respective subscribed bandwidth allocation.

17. The apparatus of claim 12, further comprising a billing mechanism configured to bill based on the destination queue depth status.

18. The apparatus of claim 12, wherein the one or more flow monitors are further configured to monitor the plurality of data flows based on the egress queue depth.

19. The apparatus of claim 12, wherein the one or more flow monitors are further configured to generate a drop probability function in response to the actual rate of over-subscribing of the respective subscribed bandwidth allocation and the egress queue depth.

20. The apparatus of claim 19 wherein the drop probability function comprises a digitized input for each of at least three conditions, wherein the at least three conditions comprise: data flow within the respective subscribed bandwidth allocation; out-of-contract but within a predetermined burst size; and both out-of-contract and out-of-burst size.

21. The apparatus of claim 20 wherein the drop probability function comprises a combination of the at least three conditions.

22. The apparatus of claim 20 wherein at least one of the one or flow monitors is configured to receive data packets from a corresponding plurality of data line cards, and to determine a condition of the at least three conditions is met for the received data packets.

23. The apparatus of claim 22, wherein the at least one gate is further configured to communicate a decision for each of the received data packets to a switch router, and wherein the switch router is configured to add received data packets to the egress queue based on the determined condition of the at least three conditions for the received data packets.

24. The apparatus of claim 23 wherein the output scheduler comprises an adaptive data scheduler.

25. The apparatus of claim 24 wherein the adaptive data scheduler enables differentiated services for various different types of the plurality of data flows.

26. A method, comprising:
determining, at an electronic switch fabric (ESF), bandwidth utilization conformance of a plurality of data flows, each data flow sent from an ingress port to an egress port, by monitoring each data flow of the plurality of data flows at its respective ingress port;
determining, at the ESF, whether there is excess bandwidth at any of the egress ports of the plurality of data flows;
responsive to determining there is no excess bandwidth at a given egress port:
determining an actual rate of over-subscribing for at least one particular data flow egressing via the given egress port by at least:
determining a difference between a rate of traffic flow for the at least one particular data flow and a subscribed bandwidth allocation for the at least one particular data flow and
determining a ratio between the difference and the rate of traffic flow for the at least one data flow, and
dropping, at the ESF, attempted excess data in proportion to the actual rate of over-subscribing for the at least one particular data flow egressing via the given egress port while passing data within the subscribed bandwidth allocation for the at least one particular data flow; and
responsive to determining there is excess bandwidth at a given egress port, permitting, at the ESF, the at least one particular data flow to exceed the subscribed bandwidth allocation for the at least one particular data flow up to an extent of the excess bandwidth.

27. The method of claim 26, further comprising: generating billing information for the particular data flow exceeding the subscribed bandwidth allocation for the at least one particular data flow.

28. The method of claim 26, wherein a subset of the plurality of data flows exceed their respective subscribed bandwidth allocations and wherein permitting the at least one particular data flow to exceed the subscribed bandwidth allocation for the at least one particular data flow comprises: allocating a fair share of the excess bandwidth to each data flow in the subset of data flows.

29. The method of claim 28, further comprising: generating billing information for each of the allocated fair shares.

30. The method of claim 26, wherein allocating the fair share comprises allocating the fair share of the excess bandwidth in proportion to a respective rate of over-subscribing.

31. The method of claim 26, further comprising: determining a destination queue depth status for each data flow of the plurality of data flows by monitoring an egress queue depth for the data flow; and wherein dropping attempted excess data further comprises dropping attempted excess data based on the egress queue depth.

32. The method of claim 26, wherein dropping attempted excess data comprises using a drop probability function to drop attempted excess data.

33. The method of claim 32, wherein the actual rate of over-subscribing for each of the at least one particular data flow is digitized into one of at least three conditions, the at least three conditions comprising: within the subscribed bandwidth allocation for the at least one particular data flow, out-of-contract but within burst size, and out-of-contract and out-of-burst-size.

34. The method of claim 33, wherein the drop probability function comprises a combination of the at least three conditions.

35. A non-transitory computer-readable medium having instructions stored thereon, the instructions comprising:
instructions to monitor a plurality of data flows at an ingress of an electronic switch fabric (ESF) to determine conformance with a respective subscribed bandwidth allocation associated with each data flow of the plurality of data flows;
instructions to determine at the ingress of the ESF and at an egress of the ESF whether there is excess bandwidth;
instructions, responsive to determining that there is no excess bandwidth, to:
determine an actual rate of oversubscribing for the at least one data flow by at least:
determine a difference between a rate of traffic flow for the at least one data flow and the respective subscribed bandwidth allocation associated with the at least one data flow and
determine a ratio between the difference and the rate of traffic flow for the at least one data flow, and
restrict one or more data flows of the plurality of data flows from exceeding the respective subscribed bandwidth allocation associated with at least one data flow of the one or more data flows, wherein restricting the one or more data flows comprises dropping attempted excess data in proportion to the actual rate of oversubscribing of the subscribed bandwidth allocation for the at least one data flow; and
instructions to, responsive to determining that there is excess bandwidth at the ESF, permit each of the one or more data flows to exceed the respective subscribed bandwidth allocation up to an extent of the excess bandwidth.

36. The non-transitory computer-readable medium of claim 35, further comprising instructions to additionally bill for exceeding the respective subscribed bandwidth allocation of the one or more data flows.

37. The non-transitory computer-readable medium of claim 35, wherein the instructions to permit the one or more data flows to exceed the respective subscribed bandwidth allocation comprise instructions to allocate a fair share of the excess bandwidth to each of the one or more data flows.

38. The non-transitory computer-readable medium of claim 37, further comprising instructions to bill based on the respective fair share allocated to the one or more data flows.

39. The non-transitory computer-readable medium of claim 35, wherein the instructions to allocate the fair share of the excess bandwidth to each of the one or more data flows comprise instructions to allocate the fair share of the excess bandwidth in proportion to the respective rate of over-subscribing of the respective subscribed bandwidth allocation.

40. The non-transitory computer-readable medium of claim 35, further comprising instructions to monitor an egress queue depth to determine destination queue depth status, and wherein the instructions to restrict the one or more data flows comprise instructions to drop the attempted excess data based on the destination queue depth status.

41. The non-transitory computer-readable medium of claim 40, wherein the instructions to permit the one or more data flows to exceed the respective subscribed bandwidth allocation comprise instructions to bill based on the destination queue depth status.

42. The non-transitory computer-readable medium of claim 40, wherein the instructions to monitor the plurality of data flows comprise instructions to monitor the plurality of data flows based on the destination queue depth status.

43. The non-transitory computer-readable medium of claim 42, wherein a drop probability function is generated in response to the actual rate of over-subscribing of the respective subscribed bandwidth allocation and the destination queue depth status.

44. The non-transitory computer-readable medium of claim 43, wherein the drop probability function comprises a digitized input for each of at least three conditions, wherein the at least three conditions comprise: data flow within the respective subscribed bandwidth allocation; out-of-contract but within a predetermined burst size; and both out-of-contract and out-of-burst size.

45. The non-transitory computer-readable medium of claim 44, wherein the drop probability function comprises a combination of the at least three conditions.

\* \* \* \* \*

UNITED STATES PATENT AND TRADEMARK OFFICE
CERTIFICATE OF CORRECTION

PATENT NO. : 8,248,932 B2
APPLICATION NO. : 10/854687
DATED : August 21, 2012
INVENTOR(S) : Wang et al.

Page 1 of 2

It is certified that error appears in the above-identified patent and that said Letters Patent is hereby corrected as shown below:

On the Face Page, in Field (56), under "OTHER PUBLICATIONS", in Column 2, Line 1, delete "Routers with a Single Stage of Buffering," and insert -- "Routers with a Single Stage of Buffering," --, therefor.

On the Face Page, in the Figure, delete "  " and insert

--  --, therefor.

In Fig. 2, Sheet 2 of 3, delete "  " and

Signed and Sealed this
Fifth Day of February, 2013

Teresa Stanek Rea
*Acting Director of the United States Patent and Trademark Office* insert --  --, therefor.

In Fig. 4, Sheet 3 of 3, in Box 1, in Line 2, delete "subsriber" and insert -- subscriber --, therefor.

In Column 1, Line 58, delete "oversubscribed" and insert -- over-subscribed --, therefor.

In Column 3, Line 41, delete "efficiently to" and insert -- to efficiently --, therefor.

In Column 3, Line 63, delete "6,684,317." and insert -- 6,684,317). --, therefor.

In Column 5, Line 13, delete "QOS" and insert -- QoS --, therefor.

In Column 8, Line 19, delete "is" and insert -- is: --, therefor.

In Column 11, Line 23, in Claim 22, delete "one or" and insert -- one or more --, therefor.

In Column 12, Line 32, in Claim 33, delete "out-of-burst-size" and
insert -- out-of-burst size --, therefor.

In Column 12, Line 47, in Claim 35, delete "oversubscribing" and
insert -- over-subscribing --, therefor.

In Column 14, Lines 18-19, in Claim 44, delete "out-of- contract" and
insert -- out-of-contract --, therefor.